UNITED STATES PATENT OFFICE.

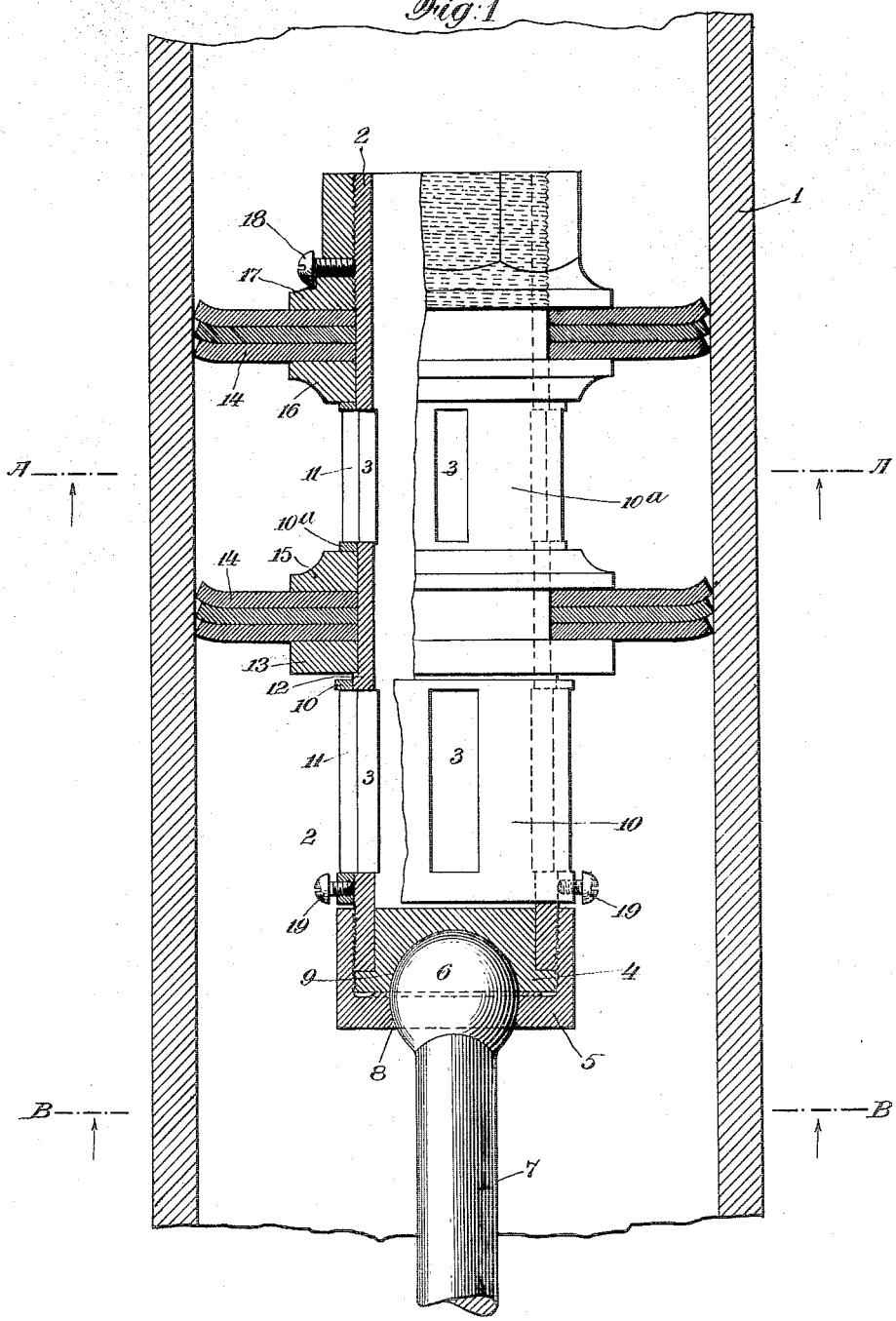

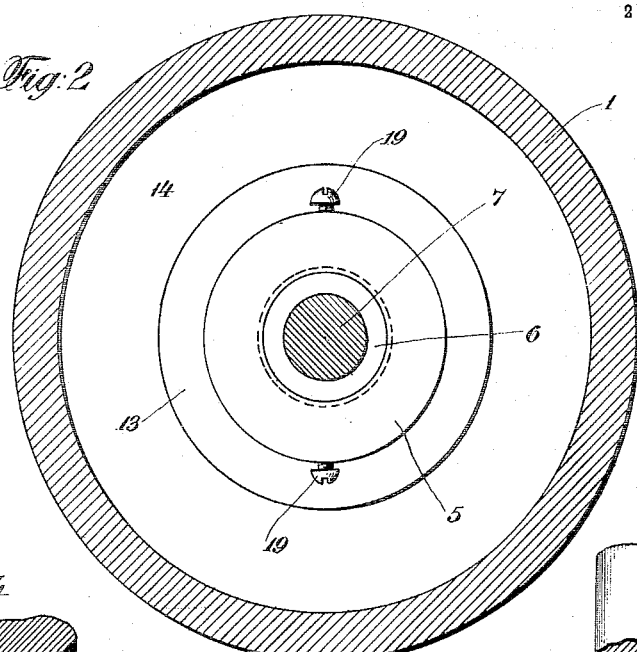
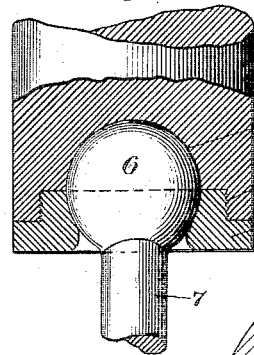
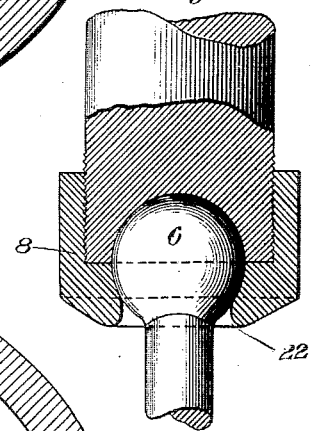
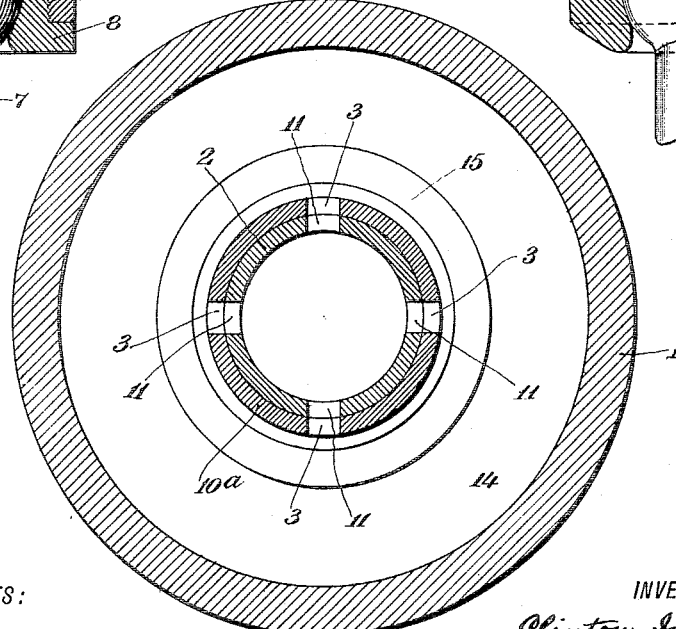

CLINTON INGLEE, OF AMITYVILLE, NEW YORK, ASSIGNOR TO NATIONAL WATER MAIN CLEANING COMPANY, A CORPORATION OF MAINE.

PIPE-CLEANING DEVICE AND PISTON THEREFOR.

953,666.   Specification of Letters Patent.   Patented Mar. 29, 1910.

Application filed April 30, 1909. Serial No. 493,090.

*To all whom it may concern:*

Be it known that I, CLINTON INGLEE, a citizen of the United States, and a resident of Amityville, county of Suffolk, and State of New York, have invented certain new and useful Improvements in Pipe-Cleaning Devices and Pistons Therefor, of which the following is a specification.

My invention relates to improvements in apparatus and devices for cleaning water pipes or mains or propellers for cleaners of like character and is adapted for use either in water cleaning devices or in connection therewith which are self propelled or are drawn through the pipes by means of a cable or otherwise.

Various objects, features and advantages of my improved device will be readily seen upon reading the detailed description given below, taken in connection with the accompanying drawings which illustrate a form of my invention.

Figure 1 is an illustration embodying the preferred form of my improvement within a pipe. Fig. 2 is a cross sectional view taken on the line B B of Fig. 1. Fig. 3 is a cross sectional view taken on the line A A of Fig. 1. Figs. 4 and 5 are modifications of my improved ball and socket joint.

Referring to the drawings in which like numerals refer to like numbers 1 is a pipe in which I have shown my propeller or piston for propelling cleaning devices through a pipe although it is adapted to be used as a cleaning device as well; 2 is a hollow shaft having openings 3—3 in its periphery so as to permit the passage of water therethrough; 4 is a cap set in one end of the hollow pipe having a round cavity 9 therein; 7 is an arm having an enlarged or ball-shaped end 6 adapted to fit into the cavity 9 of the cap 4; 5 is a cap having an opening sufficiently large to set over the arm 7 and a portion of the ball-shaped end 6 but is not sufficiently large to permit the passage of the ball end 6 through the opening 8 in the cap. This cap is screw-threaded as is also the end of the hollow shaft 2, thus enabling the cap to be screwed down onto the ball-shaped end 2, thereby holding the arm 7 with its enlarged ball end portion 6 in place.

When the cap 5 is screwed down in place it allows sufficient freedom of movement for the ball 6 to move around within its seat in the cap or body 4, thus giving a flexible joint. The object of the arm 7 is to attach the piston to a pipe cleaning device to be propelled through a water main. The flexible joint permits of the free passage around bends in the pipe, also permits the cleaning device attached thereto to revolve without the piston revolving.

Upon the hollow shaft 2 I place sleeves 10—10ª which have openings 11 corresponding to the openings in the hollow shaft 2. These sleeves are loosely mounted upon the shaft so that by rotating them the openings 3 in the hollow shaft 2 may be entirely closed or adjusted so that only a predetermined quantity of water may pass therethrough. By means of the set screws 19—19 I am enabled to retain the sleeve 10 in any desired position. In constructing my device I use a hollow shaft 2 having the outer diameter at the forward end made a trifle larger than at the rear end, thus forming a collar 12 about midway thereof. Upon the hollow shaft 2 I mount or have shrunk on the collar 13; next to the collar 13 upon the shaft I place rings 14—14, preferably of flexible material which are of a diameter equal to or a trifle larger than the inner diameter of the pipe in which the device is to be used. Then I place the first series of rings 14 on the hollow shaft 2, the collar 15, and next to this the sleeve 10ª, having openings 11. After the sleeve 10ª has been adjusted to its desired position I place upon the hollow shaft the collar 16 the second set of rings 14 and a screw nut 17 which engages the screw thread on the outer diameter of the hollow shaft 2. This screw nut is securely held in position by means of the set screw 18. As will be readily seen when the screw nut 17 is tightly screwed up against the rearward set of rings 14, the collar 16, the sleeve 10ª, the collar 15, the first set of rings 14 and the collar 13 are securely held in position against the shoulder 12.

Having adjusted the openings in the hollow shaft 2 to the desired position the operation of my device is as follows: The piston, or propeller is placed within the pipe to be cleaned and attached to a suitable cleaning device. If it is to be used as a self-propelled device, the openings having been adjusted, the force of water is turned on against the rearward part of the device, forcing same forward. If the openings 3 in the forward part of the device are opened, the water passing through acts to carry forward the removed incrustations which have been cleaned from the pipe by the operation of the cleaning device which is being propelled forward. That part of the water which goes through the openings between the two sets of rings acts upon the forward rings to help propel the device forward in the same way as the water acting upon the rear rings.

In Figs. 4 and 5 I have shown modifications of the ball and socket joint wherein they are adapted for use with a solid shaft if desired. In Figs. 4 and 5 solid shafts are shown. In Fig. 4 the shaft has a cavity or cut out portion 9 within which the ball end 6 of the arm 7 is adapted to fit and a cap 8 is screwed thereon to hold said ball in position. As will be seen the cap here is made so that it screws within the cut out portion 21 of the solid shaft 20. In Fig. 5 a smaller shaft is used than in Fig. 4 and the cap is screwed on the outside of the solid shaft instead of within the cut out portion as in Fig. 4. In Fig. 5 I also show a cap arranged so as to regulate the movement of the ball 6 within its socket or cavity. This regulation means consists in having the cap 8 constructed either with a larger or smaller opening 22 at the top of the cap as desired, according to whether more or less movement is sought for. It may also be advisable in some instances to have the arm 7 rigidly held in position so that it has no flexible movement with relation to the piston. If this is desired the cap 5 may be screwed down very tight to cap 4 or upon the shaft 2, which would cause the cut out portion 8 of the cap 5 to bind the ball-shaped end 6 of the arm 7 within the cut out portion 9 of the cap or flange 4, thus securely holding the ball-shaped end of the shaft 6 in an immovable position.

While I have illustrated and described one specific embodiment of my invention in detail, I desire it to be understood that my invention is broader than such specific embodiment which may be modified by those skilled in the art without departing from the scope of my invention as set forth in the appended claims.

What I claim as new and desire to secure by Letters Patent, is:—

1. In a device of the character described, a hollow shaft closed at one end, flexible rings mounted thereon and openings to permit the water to pass through said shaft.

2. In a device of the character described, a hollow shaft closed at one end, flexible rings mounted thereon and adjustable openings in the periphery of said shaft for the passage of water.

3. In a device of the character described, a hollow shaft, adjustable means for permitting the water to pass out through the periphery of said shaft.

4. In a device of the character described, a hollow shaft having openings in its periphery, a movable sleeve mounted thereon and adapted to regulate the area of said openings.

5. In a device of the character described, a hollow shaft closed at one end having openings in its periphery, a movable sleeve mounted thereon and adapted to regulate the area of said openings.

6. In a device of the character described, a hollow shaft having openings in its periphery, a movable sleeve mounted thereon and adapted to regulate the area of said openings, means for fixedly holding said sleeve in a predetermined position.

7. In a device of the character described, a hollow shaft having openings in its periphery, a movable sleeve mounted thereon and adapted to regulate the area of said openings, rings mounted on said shaft.

8. In a device of the character described, a hollow shaft, rings mounted thereon, openings in the periphery of said shaft, a movable sleeve mounted on said shaft, openings in said movable sleeve adapted to register with the openings in the hollow shaft.

9. In a device of the character described, a hollow shaft, rings mounted thereon, openings in the periphery of said shaft, a movable sleeve mounted on said shaft, openings in said movable sleeve adapted to register with the openings in the hollow shaft, means for fixedly holding said sleeve in a predetermined position.

10. In a device of the character described, a hollow shaft closed at one end, rings mounted thereon, openings in the periphery of said shaft, a movable sleeve mounted on said shaft, openings in said movable sleeve adapted to register with the openings in the hollow shaft.

11. In a device of the character described, a hollow shaft closed at one end only, flexible rings mounted thereon, openings in the periphery of said shaft.

12. In a device of the character described, a hollow shaft, flexible rings mounted thereon, adjustable openings in the periphery of said shaft.

13. In a device of the character described, a hollow shaft, cleaning devices mounted thereon, and openings in the periphery of said shaft between the said devices.

14. In a device of the character described, a hollow shaft, cleaning devices mounted thereon, and adjustable openings in the periphery of said shaft between the said devices.

15. In a device of the character described, a hollow shaft, a shoulder thereon, rings separated by an adjustable sleeve and means for holding same fixedly mounted on said shaft.

16. In a device of the character described, a hollow shaft, adjustable openings in the periphery thereof, a shoulder thereon, rings separated by a sleeve and means for holding same fixedly mounted on said shaft.

17. In a device of the character described, a hollow shaft closed at one end, flexible rings mounted thereon and openings in the periphery of said shaft for the passage of water, an arm flexibly connected to one end of said shaft.

18. In a device of the character described, a hollow shaft having openings in its periphery, a movable sleeve mounted thereon and adapted to regulate the area of said openings, an arm flexibly connected to one end of said shaft.

19. In a device of the character described, a hollow shaft closed at one end, flexible rings mounted thereon and openings in the periphery of said shaft for the passage of water, a ball and socket joint at one end of said shaft.

20. In a device of the character described, a hollow shaft having openings in its periphery, a movable sleeve mounted thereon and adapted to regulate the area of said openings, a ball and socket joint at one end of said shaft.

21. In a device of the character described, a hollow shaft, a cap closing one end thereof, a cavity in said cap, an arm having a solid ball end adapted to fit in said cavity and means for holding same therein.

22. In a device of the character described, a hollow shaft closed at one end, flexible cleaning devices mounted thereon and openings in the periphery of said shaft for the passage of water.

23. In a device of the character described, a hollow shaft having openings in its periphery, a movable sleeve mounted thereon and adapted to regulate the area of said openings, cleaning devices mounted on said shaft.

24. In a device of the character described, a hollow shaft closed at one end, rings of a diameter equal to or greater than the inner diameter of the pipe through which it is to pass mounted thereon and openings in the periphery of said shaft for the passage of water.

25. In a device of the character described, a hollow shaft closed at one end, flexible cleaning devices mounted thereon and adjustable openings in the periphery of said shaft.

In testimony whereof, I have signed my name to this specification, in the presence of two subscribing witnesses.

CLINTON INGLEE.

Witnesses:
Geo. W. Mills, Jr.,
Edwin Seger.